US009376922B2

(12) United States Patent
Bommanakatte et al.

(10) Patent No.: US 9,376,922 B2
(45) Date of Patent: Jun. 28, 2016

(54) INTERIOR CONFIGURATION FOR TURBINE ROTOR BLADE

(71) Applicant: General Electric Company, Schenectady, NY (US)

(72) Inventors: Harish Bommanakatte, Bangalore (IN); Jalindar Appa Walunj, Bangalore (IN); Anthony Louis Giglio, Simpsonville, SC (US); Jason Douglas Herzlinger, Schenectday, NY (US)

(73) Assignee: General Electric Company, Schenectady, NY (US)

( * ) Notice: Subject to any disclaimer, the term of this patent is extended or adjusted under 35 U.S.C. 154(b) by 768 days.

(21) Appl. No.: 13/737,031

(22) Filed: Jan. 9, 2013

(65) Prior Publication Data

US 2014/0193273 A1    Jul. 10, 2014

(51) Int. Cl.
*F01D 5/08*    (2006.01)
*F01D 5/18*    (2006.01)

(52) U.S. Cl.
CPC ............... *F01D 5/189* (2013.01); *F01D 5/187* (2013.01); *F05D 2240/303* (2013.01); *F05D 2260/201* (2013.01); *Y02T 50/672* (2013.01); *Y02T 50/673* (2013.01); *Y02T 50/676* (2013.01)

(58) Field of Classification Search
CPC ... F01D 5/187; F01D 5/189; F05D 2240/303; F05D 2260/201
See application file for complete search history.

(56) References Cited

U.S. PATENT DOCUMENTS

| | | | |
|---|---|---|---|
| 4,752,186 A * | 6/1988 | Liang | F01D 5/187 416/97 R |
| 5,374,162 A * | 12/1994 | Green | F01D 5/186 415/115 |
| 6,290,463 B1 | 9/2001 | Fargher et al. | |
| 6,966,756 B2 | 11/2005 | McGrath et al. | |
| 6,981,846 B2 * | 1/2006 | Liang | F01D 5/186 416/97 R |
| 7,377,746 B2 | 5/2008 | Brassfield et al. | |
| 7,520,723 B2 * | 4/2009 | Liang | F01D 5/187 416/97 R |
| 7,670,108 B2 * | 3/2010 | Liang | F01D 11/005 415/115 |
| 7,690,892 B1 * | 4/2010 | Liang | F01D 5/186 416/1 |
| 7,780,414 B1 * | 8/2010 | Liang | B22C 9/10 164/369 |
| 7,798,776 B1 * | 9/2010 | Liang | F01D 5/186 415/115 |
| 7,988,410 B1 * | 8/2011 | Liang | F01D 9/04 415/115 |
| 2007/0128034 A1 * | 6/2007 | Lee | F01D 5/187 416/97 R |
| 2008/0028606 A1 | 2/2008 | Krishnakumar et al. | |

* cited by examiner

*Primary Examiner* — Igor Kershteyn
(74) *Attorney, Agent, or Firm* — Mark E. Henderson; Ernest G. Cusick; Frank A. Landgraff (57) ABSTRACT

An interior cooling configuration formed within an airfoil of a blade of a combustion turbine engine is provided. The interior cooling configuration may include a first flow passage and a second flow passage that have a side-by-side configuration for a segment, and multiple lateral crossover passages extending between and fluidly connecting the first flow passage to the second flow passage. The crossover passages may be staggered.

21 Claims, 10 Drawing Sheets

Figure 13 ization of cooling channels within turbage rotor blades.

INTERIOR CONFIGURATION FOR TURBINE ROTOR BLADE

BACKGROUND OF THE INVENTION

The present application relates generally to apparatus and assemblies concerning the design and operation of rotor blades in turbine engines. More specifically, but not by way of limitation, the present application relates to configurations of cooling channels within turbine rotor blades.

As provided below, the invention of the present application is described in relation to exemplary applications within the turbine section of a combustion turbine engine. It will be appreciated by those of ordinary skill in the art that the present invention may also be used in other types of combustion turbines, such as those used in commercial aircraft.

It will be appreciated that combustion turbine engines generally include a compressor, combustor, and turbine sections. The compressor and turbine sections generally include rows of blades that are axially stacked in stages. Each stage includes a row of circumferentially-spaced stator blades, which are fixed, and a row of rotor blades, which rotate about a central turbine axis or shaft. In operation, generally, the compressor rotor blades rotate about the shaft, and, acting in concert with the stator blades, compress a flow of air. The supply of compressed air then is used in the combustor to combust a supply of fuel. The resulting flow of hot expanding gases from this combustion, i.e., the working fluid, is expanded through the turbine section of the engine. The flow of working fluid through the turbine induces the rotor blades to rotate. The rotor blades are connected to a central shaft such that the rotation of the rotor blades rotates the shaft. In this manner, the energy contained in the fuel is converted into the mechanical energy of the rotating shaft, which, for example, may be used to rotate the rotor blades of the compressor, such that the supply of compressed air needed for combustion is produced, and the coils of a generator, such that electrical power is generated.

During operation, because of the extreme temperatures of the hot-gas path, the velocity of the working fluid, and the rotational velocity of the engine, turbine blades, which, as described, generally include both the rotating rotor blades and the fixed, circumferentially-spaced stator blades, become highly stressed with extreme mechanical and thermal loads.

The ever-increasing demand for energy makes the objective of engineering more efficient combustion turbine engines an ongoing and significant one. While several strategies for increasing the efficiency of turbine engines are known, it remains a challenging objective because these alternatives—which, for example, include increasing the size of the engine, increasing the temperatures through the hot-gas path, and increasing the rotational velocities of the rotor blades—generally place additional strain on parts that are already highly stressed. As a result, improved apparatus and assemblies that mitigate the operational stresses placed on turbine blades are in great demand.

As one of ordinary skill in the art will appreciate, one strategy for alleviating the thermal stress on the blades is through active cooling during operation, which may allow the blades to withstand higher firing temperatures, withstand greater mechanical stresses at high operating temperatures, and/or extend the life of the blades, all of which may allow the turbine engine to be more cost-effective and efficient in its operation. One way to cool blades during operation is through the use of internal cooling passageways or circuits. Generally, this involves passing a relatively cool supply of compressed air, which may be supplied by the compressor of the turbine engine, through internal cooling channels within the blades. As the compressed air passes through the blade, it convectively cools the blade, which allows the part to withstand firing temperatures that it otherwise could not.

For a number of reasons, it will be appreciated that great care is required in designing and manufacturing the configuration of these cooling channels. First, the use of cooling air comes at a price. That is, air that is diverted from the compressor to the turbine section of the engine for cooling bypasses the combustor and, thus, decreases the efficiency of the engine. As such, cooling passages must be designed to use air in a highly effective manner, i.e., provide the necessary coverage and cooling efficiency, so that a minimum amount of air is needed for this purpose. Second, to reduce mechanical loads, cooling passages should be formed to remove unnecessary weight from the blade; however, the blades still must remain strong to withstand the large mechanical loads. Cooling channels, therefore, must be designed such that the turbine blade has a lightweight but strong construction, while stress concentrations that would negatively affect the blades resilience are avoided. In short, what is needed is a turbine blade cooling configuration that performs well in more aggressively shaped, thinner aerodynamic blade configurations, promotes lighter blade internal construction, maintains the structural support of the turbine blade, and delivers high cooling effectiveness.

BRIEF DESCRIPTION OF THE INVENTION

The present application thus describes an interior cooling configuration formed within an airfoil of a rotor blade of a combustion turbine engine. In one example, the interior cooling configuration may include: a first flow passage and a second flow passage extending radially and in parallel within a segment between an inboard position and an outboard position; multiple lateral crossover passages extending linearly between and fluidly connecting the first flow passage to the second flow passage, the crossover passages being spaced at regular radial intervals within the segment. The reference plane may bisect the first flow passage and the second flow passage, and the crossover passages may be staggered relative to the reference plane.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

As an initial matter, in order to clearly delineate the invention of the current application, it may be necessary to select terminology that refers to and describes certain parts or machine components within a combustion turbine engine. As mentioned, while the examples provided herein are primarily aimed at combustion turbine engines, those of ordinary skill in the art will appreciate that the present invention is applicable to the rotor blades used in combustion or steam turbine engines. Whenever possible, common industry terminology will be used and employed in a manner consistent with its accepted meaning. However, it is meant that any such terminology be given a broad meaning and not narrowly construed such that the meaning intended herein and the scope of the appended claims is unreasonably restricted. Those of ordinary skill in the art will appreciate that often a particular component may be referred to using several different terms. In addition, what may be described herein as being single part may include and be referenced in another context as consisting of multiple components, or, what may be described herein as including multiple components may be referred to elsewhere as a single part. As such, in understanding the scope of the present invention, attention should not only be paid to the terminology and description provided herein, but also to the structure, configuration, function, and/or usage of the component, particularly as provided in the appended claims.

In addition, several descriptive terms may be used regularly herein, and it should prove helpful to define these terms at the onset of this section. Accordingly, these terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. As such, the term "downstream" corresponds to the direction of flow of the fluid, and the term "upstream" refers to the direction opposite to the flow. The terms "forward" and "aft", without any further specificity, refer to directions, with "forward" referring to the forward or compressor end of the engine, and "aft" referring to the aft or turbine end of the engine. The term "radial" refers to movement or position perpendicular to an axis. It is often required to describe parts that are at differing radial positions with regard to a center axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Figure 1:
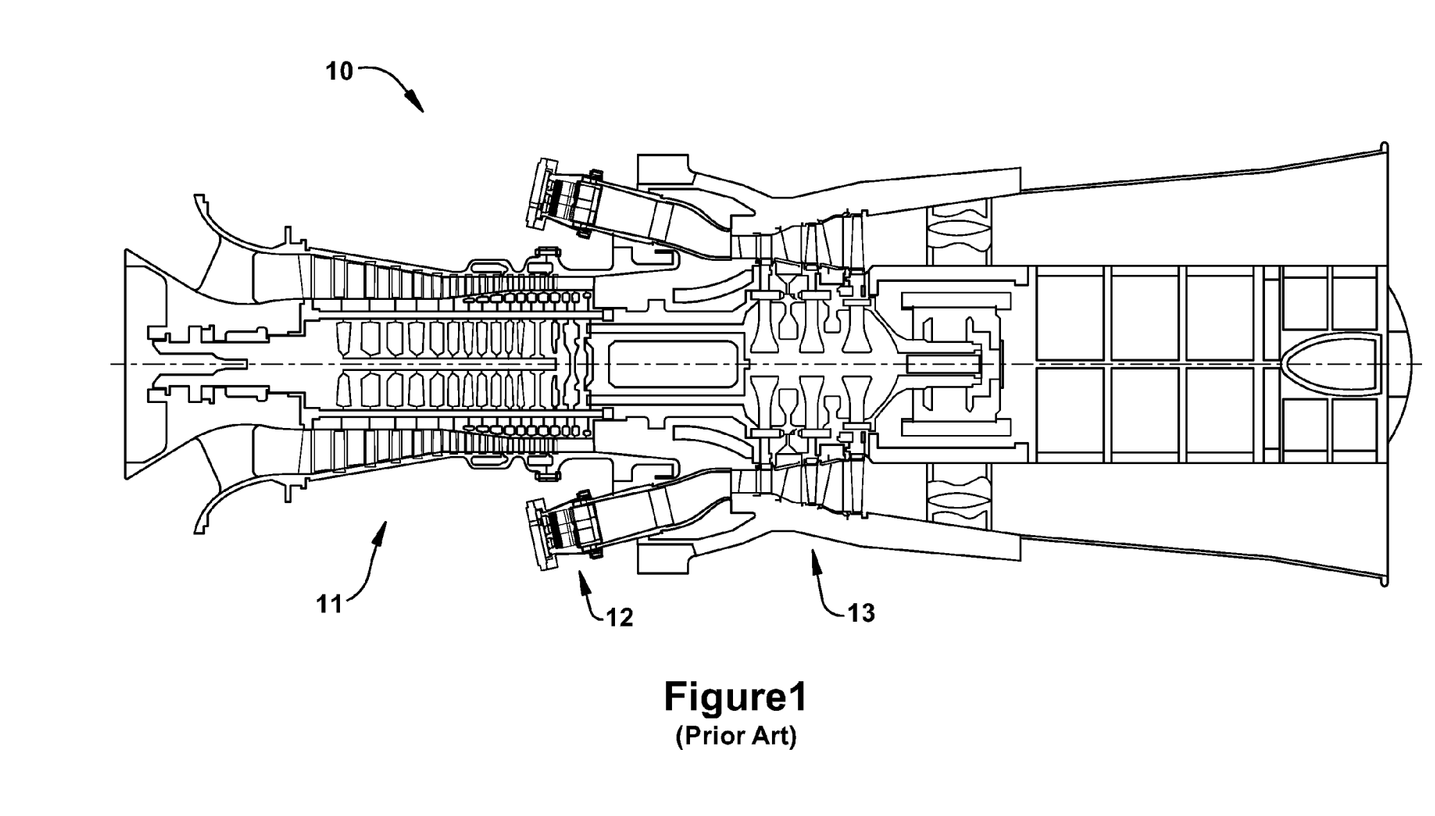
FIG. 1 is a schematic representation of an exemplary turbine engine in which certain embodiments of the present application may be used.
Figure 2:
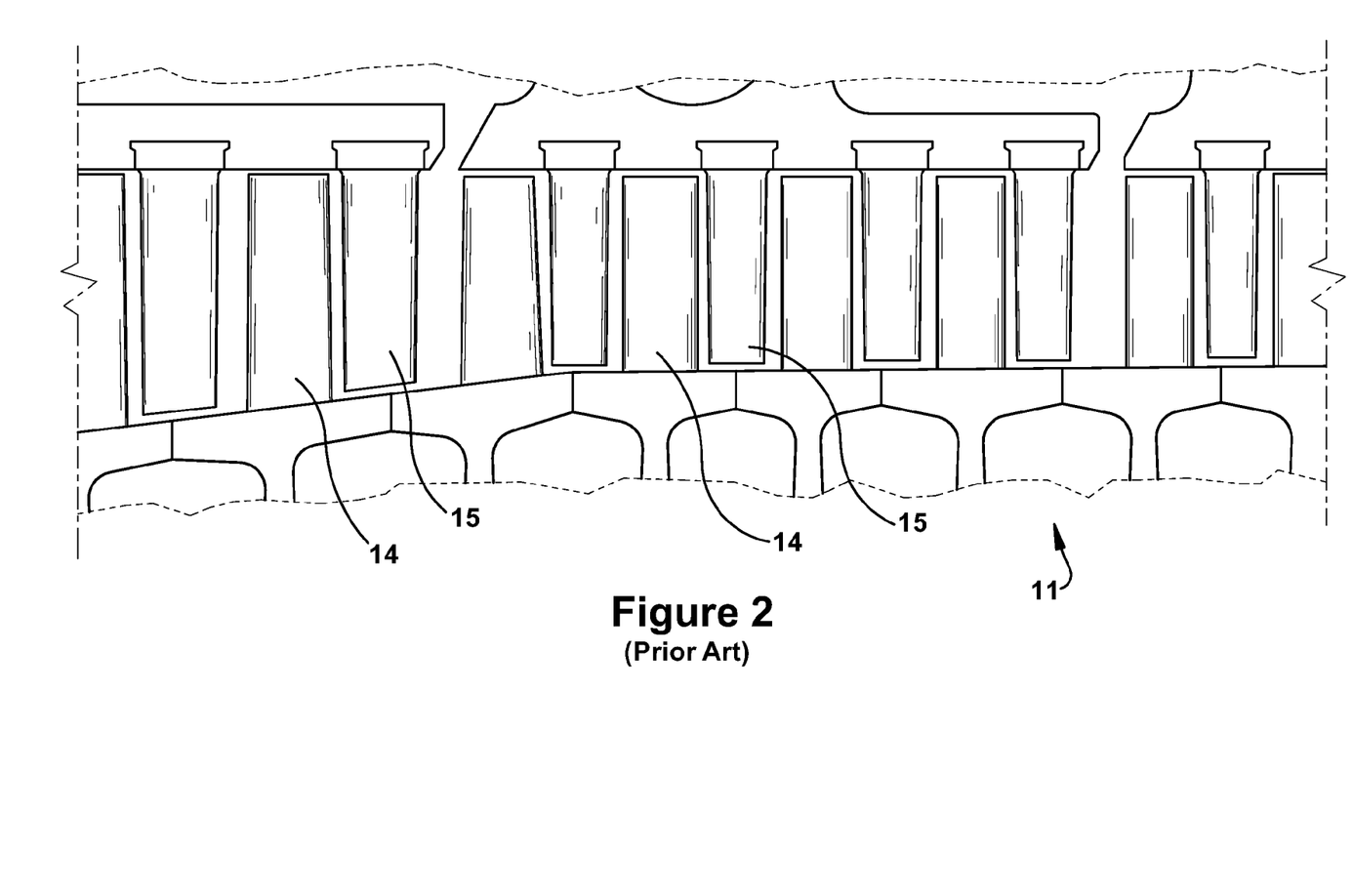
FIG. 2 is a sectional view of the compressor section of the combustion turbine engine of FIG. 1.
Figure 3:
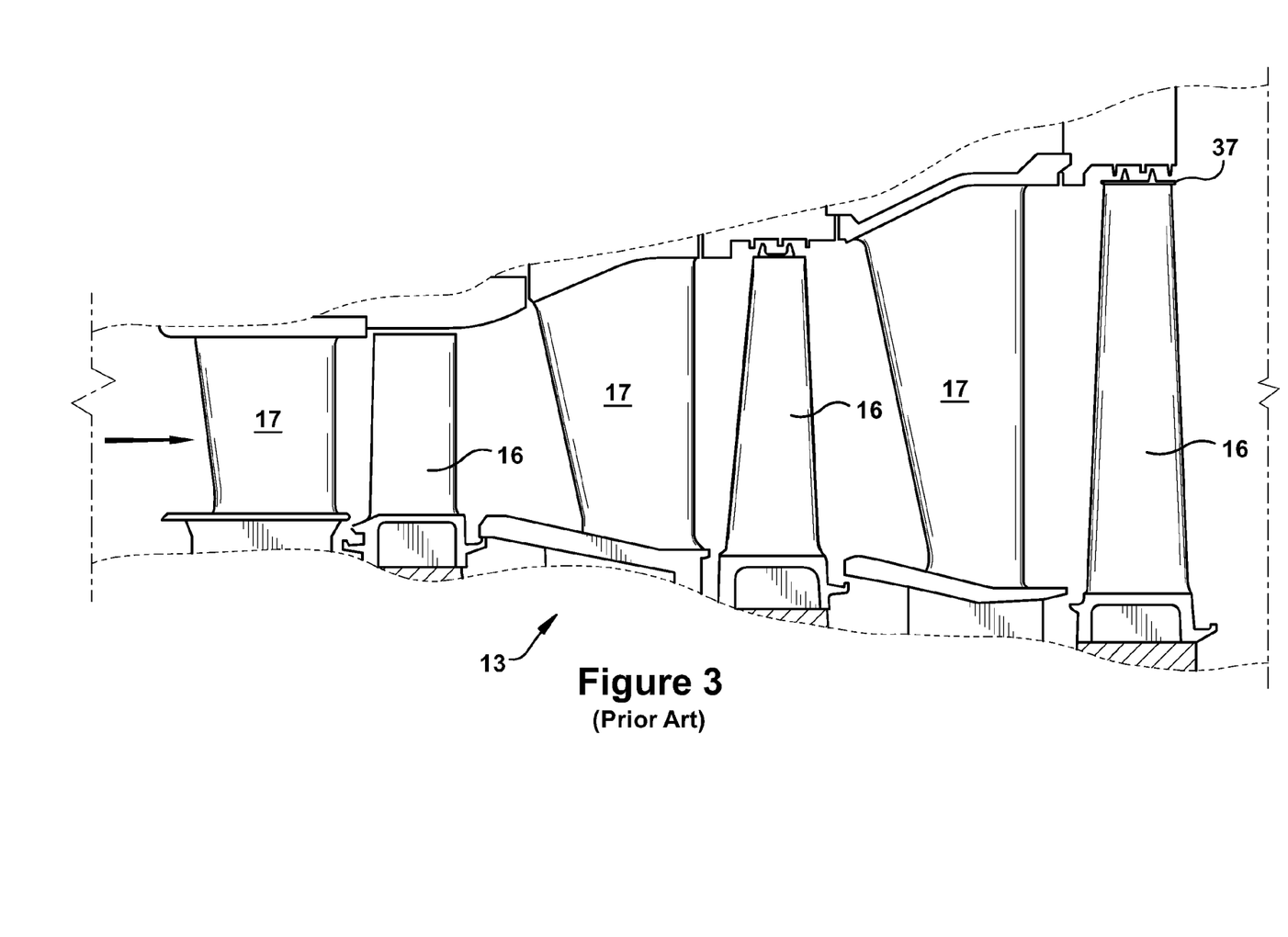
FIG. 3 is a sectional view of the turbine section of the combustion turbine engine of FIG. 1.

By way of background, referring now to the figures, FIGS. 1 through 3 illustrate an exemplary combustion turbine engine in which embodiments of the present application may be used. It will be understood by those skilled in the art that the present invention is not limited to this type of usage. As stated, the present invention may be used in combustion turbine engines, such as the engines used in power generation and airplanes, steam turbine engines, and other types of rotary engines. The examples provided are not meant to be limiting to the type of the turbine engine.

FIG. 1 is a schematic representation of a combustion turbine engine 10. In general, combustion turbine engines operate by extracting energy from a pressurized flow of hot gas produced by the combustion of a fuel in a stream of compressed air. As illustrated in FIG. 1, combustion turbine engine 10 may be configured with an axial compressor 11 that is mechanically coupled by a common shaft or rotor to a downstream turbine section or turbine 13, and a combustor 12 positioned between the compressor 11 and the turbine 13.

FIG. 2 illustrates a view of an exemplary multi-staged axial compressor 11 that may be used in the combustion turbine engine of FIG. 1. As shown, the compressor 11 may include a plurality of stages. Each stage may include a row of compressor rotor blades 14 followed by a row of compressor stator blades 15. Thus, a first stage may include a row of compressor rotor blades 14, which rotate about a central shaft, followed by a row of compressor stator blades 15, which remain stationary during operation.

FIG. 3 illustrates a partial view of an exemplary turbine section or turbine 13 that may be used in the combustion turbine engine of FIG. 1. The turbine 13 may include a plurality of stages. Three exemplary stages are illustrated, but more or less stages may be present in the turbine 13. A first stage includes a plurality of turbine buckets or turbine rotor blades 16, which rotate about the shaft during operation, and a plurality of nozzles or turbine stator blades 17, which remain stationary during operation. The turbine stator blades 17 generally are circumferentially spaced one from the other and fixed about the axis of rotation. The turbine rotor blades 16 may be mounted on a turbine wheel (not shown) for rotation about the shaft (not shown). A second stage of the turbine 13 also is illustrated. The second stage similarly includes a plurality of circumferentially spaced turbine stator blades 17 followed by a plurality of circumferentially spaced turbine rotor blades 16, which are also mounted on a turbine wheel for rotation. A third stage also is illustrated, and similarly includes a plurality of turbine stator blades 17 and rotor blades 16. It will be appreciated that the turbine stator blades 17 and turbine rotor blades 16 lie in the hot gas path of the turbine 13. The direction of flow of the hot gases through the hot gas path is indicated by the arrow. As one of ordinary skill in the art will appreciate, the turbine 13 may have more, or in some cases less, stages than those that are illustrated in FIG. 3. Each additional stage may include a row of turbine stator blades 17 followed by a row of turbine rotor blades 16.

In one example of operation, the rotation of compressor rotor blades 14 within the axial compressor 11 may compress a flow of air. In the combustor 12, energy may be released when the compressed air is mixed with a fuel and ignited. The resulting flow of hot gases from the combustor 12, which may be referred to as the working fluid, is then directed over the turbine rotor blades 16, the flow of working fluid inducing the rotation of the turbine rotor blades 16 about the shaft. Thereby, the energy of the flow of working fluid is transformed into the mechanical energy of the rotating blades and, because of the connection between the rotor blades and the shaft, the rotating shaft. The mechanical energy of the shaft may then be used to drive the rotation of the compressor rotor blades 14, such that the necessary supply of compressed air is produced, and also, for example, a generator to produce electricity.

Figure 4:
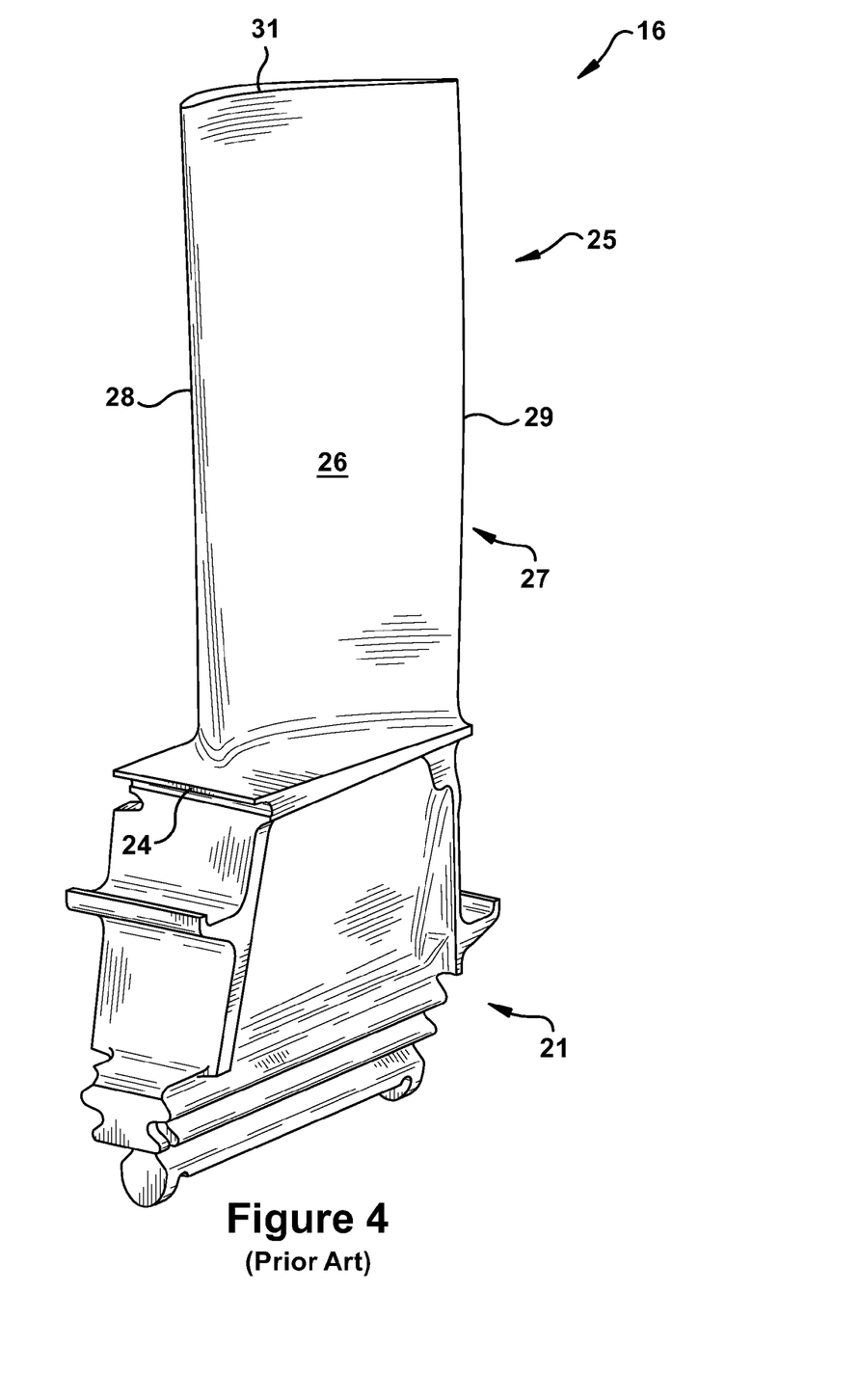
FIG. 4 is a perspective view of a turbine rotor blade of the type in which embodiments of the present invention may be employed.

FIG. 4 is a perspective view of a turbine rotor blade 16 of the type in which embodiments of the present invention may be employed. The turbine rotor blade 16 includes a root 21 by which the rotor blade 16 attaches to a rotor disc. The root 21 may include a dovetail configured for mounting in a corresponding dovetail slot in the perimeter of the rotor disc. The root 21 may further include a shank that extends between the dovetail and a platform 24, which is disposed at the junction of the airfoil 25 and the root 21 and defines a portion of the inboard boundary of the flow path through the turbine 13. It will be appreciated that the airfoil 25 is the active component of the rotor blade 16 that intercepts the flow of working fluid and induces the rotor disc to rotate. While the blade of this example is a turbine rotor blade 16, it will be appreciated that the present invention also may be applied to other types of blades within the turbine engine 10, including turbine stator blades 17. It will be seen that the airfoil 25 of the rotor blade 16 includes a concave pressure sidewall 26 and a circumferentially or laterally opposite convex suction sidewall 27 extending axially between opposite leading and trailing edges 28, 29 respectively. The sidewalls 26 and 27 also extend in the radial direction from the platform 24 to an outboard tip 31.

Figure 5:
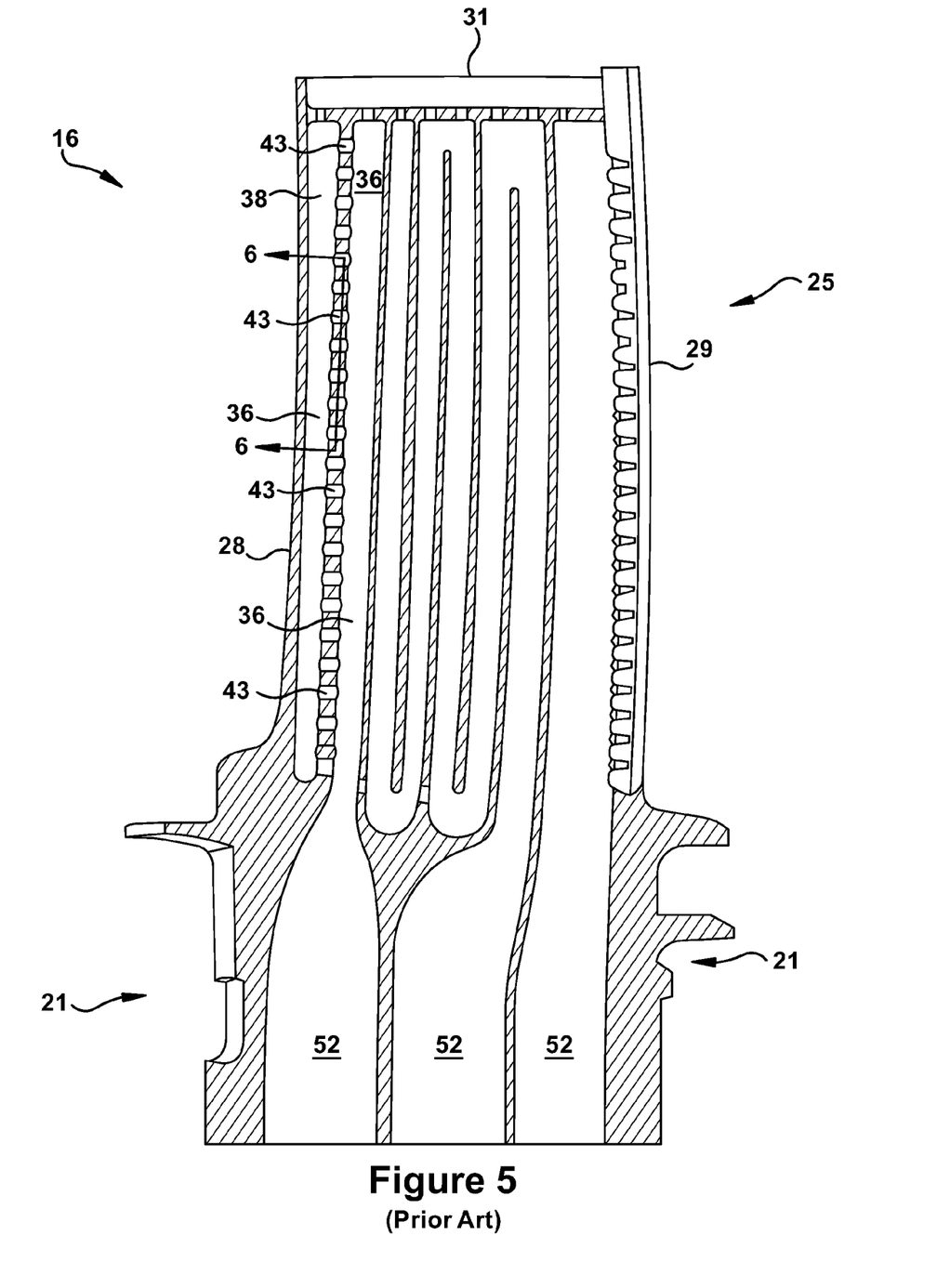
FIG. 5 is a sectional side view of a turbine rotor blade having interior cooling channels of a conventional design.
Figure 6:
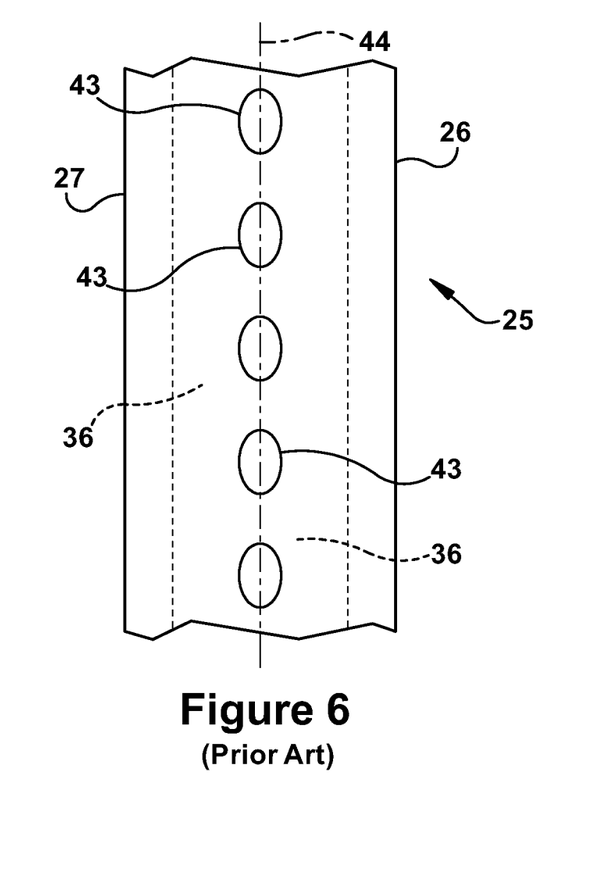
FIG. 6 is a sectional view taken along 6-6 of FIG. 5 illustrating a conventional alignment of crossover passages.
Figure 7:
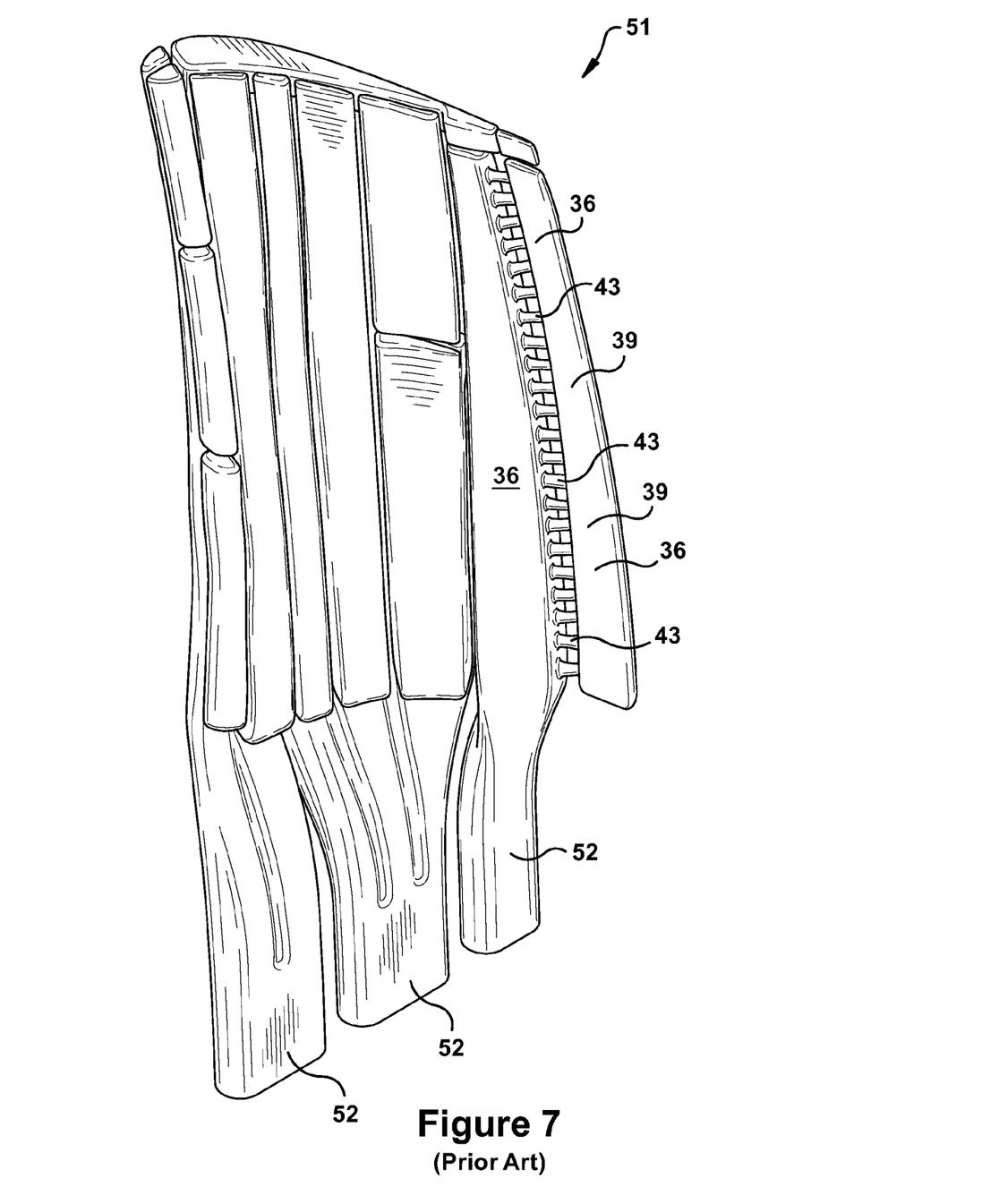
FIG. 7 is a perspective view of a casting core for a turbine rotor blade according to a conventional design.

FIGS. 5 through 7 provide several views of interior cooling passages having a configuration of conventional design. These illustrate exemplary internal arrangements in which the present invention may be used as discussed in relation to FIGS. 8 through 13 below. In general, the interior cooling channels may include one or more supply passages 52 that connect to a plurality of flow passages 36 formed within the airfoil 25. The supply passage 52 may connect to a coolant source through the root 21 of the rotor blade 16, and supply the flow passages 36 with pressurized coolant. As illustrated, some of the flow passages 36 may include a number of axially-stacked serpentine passages. This design type may include flow passages 36 that extend outboard to a 180 degree turn positioned near the outboard tip 31 of the airfoil 25 and flow passages 36 that extend inboard to another 180 degree turn positioned near the platform 24 of the rotor blade 16. As also shown in FIGS. 5 and 7, the airfoil 25 may include other flow passages 36 that are not part of the serpentine circuit. For example, as shown in FIG. 5, a leading edge flow passage 38 extends parallel and in proximity to the leading edge 28 of the airfoil 25. To the other side, this flow passage 38 is flanked by a flow passage 38 that extends side-by-side to it for a distance or segment of its length.

Extending side-by-side in this manner within the segment, this pair of flow passages 36 may be connected by several crossover passages 43. As shown, the crossover passages 43 are narrow impingement passages that extend between and connect the side-by-side extending flow passages 36. The crossover passages 43 are typically oriented approximately perpendicular to the longitudinal axis of the flow passages 36 they connect. As illustrated, many crossover passages 43 may be included. The crossover passages 36 may be linear in configuration and reside at spaced intervals over the distance in which the flow passages 36 extend side-by-side. It will be appreciated that the specific number of crossover passages 43 used in a particular design may vary depending on the length of the side-by-side segment, the cooling requirements of the airfoil 25, and other relevant criteria.

FIG. 6 is a sectional view taken along 6-6 of FIG. 5 illustrating a conventional alignment of crossover passages 43. As shown, the crossover passages 43 may be aligned within a reference plane 44. This type of alignment results in the crossover passages 43 being aligned linearly.

FIG. 7 is a perspective view of a casting core for a turbine rotor blade 14 having an internal cooling arrangement according to another conventional design. As shown, in this case, the trailing edge flow passage 39 extends parallel to the trailing edge 29 of the airfoil 25. To the other side, the trailing edge flow passage 39 extends side-by-side another flow passage 36 that resides in spaced relation to it. The trailing edge flow passage 39 may be connected to this neighboring flow passage 36 via a plurality of similarly formed crossover passages 43. As shown most clearly in FIG. 6, the flow passages 43 may be aligned within a common plane, which results in a linear alignment.

It will be appreciated that crossover passages 43 are typically provided to enhance the cooling effectiveness of coolant within targeted areas of the airfoil 25. More specifically, the narrow cross-sectional flow area of the crossover passages 43 is configured to impinge the coolant flowing into the leading edge or trailing edge flow passages 38, 39 so to improve heat transfer rate or cooling effectiveness. This type of cooling configuration may be used to address parts of the airfoil 25 that experience the most extreme thermal loads during operation, which may include areas surrounding the leading edge 28 and the trailing edge 29 of the airfoil 25.

As shown in FIGS. 5 through 7, the conventional arrangement of the crossover passages 43 stacks them at regularly spaced radially intervals and aligns them within a common plane or linear axis. While this conventional alignment simplifies certain aspects of the casting process during the manufacture of the rotor blades 16, it has been found to decrease the structural integrity of the airfoil 25 by weakening it along an extended axis. More specifically, the formation of internal cavities—such as the crossover passages 43—creates areas of weakness within the airfoil structure. When loaded during use, the airfoil structure compensates by shifting load to the structural regions that surrounds the weak spot, which results in stress concentrations. If internal features are aligned pursuant to a common plane or linear axis—as conventional design does in the case of crossover passages 43—the structure is limited as to how it may disperse or dissipate stress concentrations, resulting in concentrated loads that quicken the rate at which fatigue and creep negatively impact the rotor blade 16. The conventional arrangement thereby negatively impacts the strength and robustness of the rotor blade 16, which thereby increases the rate at which the airfoil degrades during operation. Additionally, the alignment of weak spots and stresses concentrations along a common plane or axis that stretches across a significant region of the airfoil 25 increases the chance of a sudden, larger scale failure event within the rotor blade 16, which can lead to large scale damage to the turbine engine. It will be appreciated that these shortcomings of conventional design generally increase the costs associated with operating a turbine engine 10.

Figure 8:
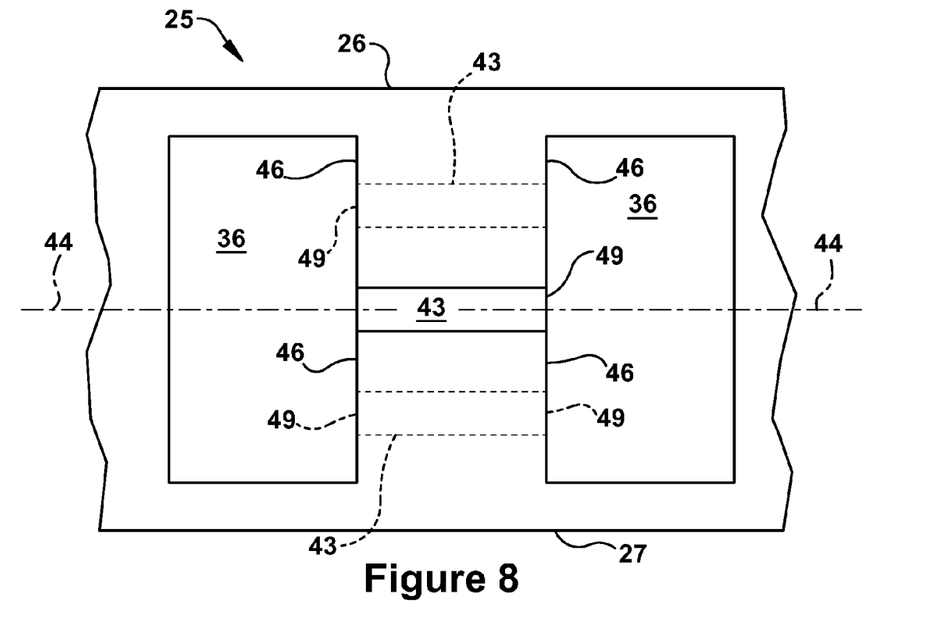
FIG. 8 is sectional top view of a schematic airfoil design showing a staggered alignment of cross-over holes in accordance with a embodiment of the present invention.
Figure 9:
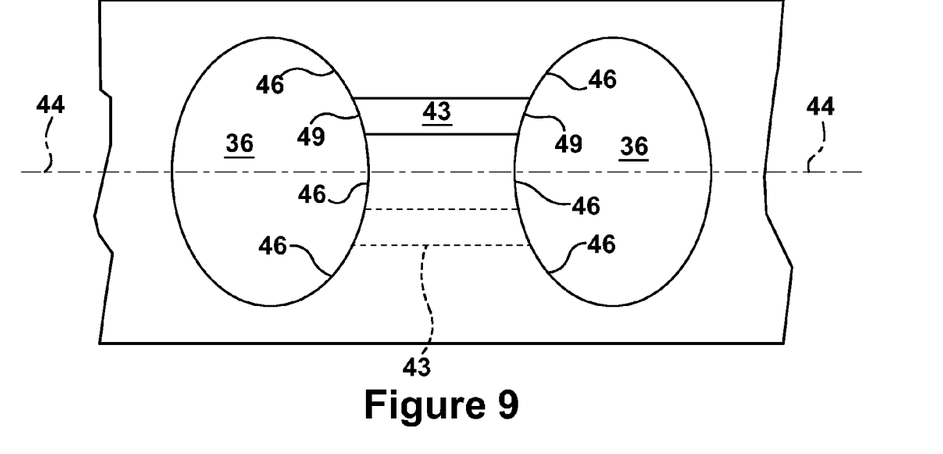
FIG. 9 is sectional top view of a schematic airfoil design showing a staggered alignment of cross-over holes in accordance with an alternative embodiment of the present invention.

Turning to FIGS. 8 through 13, several exemplary embodiments of the present invention are illustrated. Those of ordinary skill in the art will appreciate, that the present invention is not limited to only these specific configurations and may be applied as broadly as the appended claims allow. FIG. 8 is sectional top view of a schematic airfoil 25 design showing a staggered alignment of crossover passages 43 in accordance with an embodiment of the present invention. FIG. 9 provides a similar view showing a staggered alignment of crossover passages 43 in accordance with an alternative embodiment. As shown in each exemplary case, a first flow passage 36 and a second flow passage 36 may extend parallel and in spaced relation to the other within a segment defined within an inboard and an outboard position. The inboard position may be near the platform 24 of the rotor blade 16 and the outboard position may be near an outboard tip 31 of the airfoil 25. Those of ordinary skill will appreciate that the present invention may be used in airfoils 25 having different configurations than those discussed here. Within this segment, multiple lateral crossover passages 43 may connect the flow passages 36. The crossover passages 43 may extend linearly between the flow passages 36 and thereby fluidly connect them. As before, the crossover passages 43 may be spaced at regular radial intervals within the segment, i.e., spaced along the longitudinal axis of the flow passages 36.

According to the present invention the crossover passages 43 may be staggered. In certain embodiments, the crossover passages 43 may be staggered relative to or about a reference plane 44. That is, the reference plane 44 essentially provides a landmark relative to which the crossover passages 43 are located so to achieve a staggered, non-linear configuration. The reference plane 44, according to the present invention, may be defined in several ways.

It will be appreciated that the reference plane 44 bisects the flow passages 36. Each of the flow passages 36 may be described as including a facing inner wall 46, which is the inner wall that "faces" or is aimed toward the other flow passage. FIGS. 8 and 9 provide schematic representations of flow passages 36 having differing cross-sectional shapes, and the facing inner wall 46 is indicated on each so to provide examples as to the meaning of this term. In FIG. 8, in which the cross-sectional shape of the flow passages 36 is rectangular, the facing inner wall 46 is the side of the rectangle that faces the other flow passage. In FIG. 9, in which the flow passages 36 have a more rounded cross-sectional shape, the facing inner wall 46 is the approximate half of the circumference of the circular shape that faces the other flow passage, which, may be described as referring to the inner wall 46 that would be "visible" from the perspective of the other of the side-by-side flow passages 36. With this in mind, the reference plane 44 may be described as one that bisects each of the inner facing walls 46.

The reference plane 44 may be defined more specifically relative to a dimension of the facing inner wall 46. For example, a radially extending reference line on each of the facing inner walls 46 may be defined relative to, for example, the outer edges or the center of the inner facing wall. Accordingly, in one case, this radially extending reference line may be defined as a centerline that bisects the inner facing wall 46 or, in another case, a reference line that resides offset a certain distance from one of the outer edges of the inner facing wall 46. It will be appreciated that the reference plane 44 may then be defined as a smooth plane that includes each of the reference lines thusly formed on the inner facing walls 46. In both FIGS. 8 and 9, it will be appreciated that the reference plane 44 is located at the approximate center of the facing inner wall 46 of each of the flow passages 36.

Given the sectional view of FIGS. 8 and 9, only a single crossover passage 43 is visible, though two other nonvisible crossover passages 43 are represented by dashed lines. It will be appreciated that these non-visible crossover passages 43 reside at different locations along the longitudinal axis of the side-by-side flow passages 36. Further, it will be appreciated that the reference plane 44 is represented in such a view as a line. According to embodiments of the present invention, and as illustrated in FIG. 8, the staggered configuration may include crossover passages 43 that are located to each side of the reference plane 44 as well as on the reference plane 44. According to other embodiments of the present invention, and as illustrated in FIG. 9, the staggered configuration may include only crossover passages 43 that are located to each side of the reference plane 44. In certain preferred embodiments, the varying of the location of the crossover passage 43 relative to the reference plane may occur as a repeating pattern, though this is not a requirement.

The reference plane 44 may be straight or flat plane. It will be appreciated that, given the shape of airfoils 25, the reference plane 44 may also be plane that includes smooth curvature. In such cases, the reference plane 44 may be defined relative to a dimension of the airfoil 25 or the flow passages 36 that varies within the segment. As described above, the reference plane 44 may be defined relative to a thickness or centerline of the flow passages. Because of the curved and narrowing nature of the airfoil 25 and its changing cross-sectional shape, the flow passages 36 formed therein may also be curved and narrowing and have a changing cross-sectional shape. Accordingly, if the reference plane 44 is formed via the thickness or centerline of the side-by-side flow passages, the reference plane 44 may be a curved plane. As stated, the reference plane 44 may also be defined relative to a dimension of the airfoil 25. For example, in certain embodiments, the reference plane is defined relative to the position of the pressure sidewall 26 or the suction sidewall 27 or both.

Figure 10:
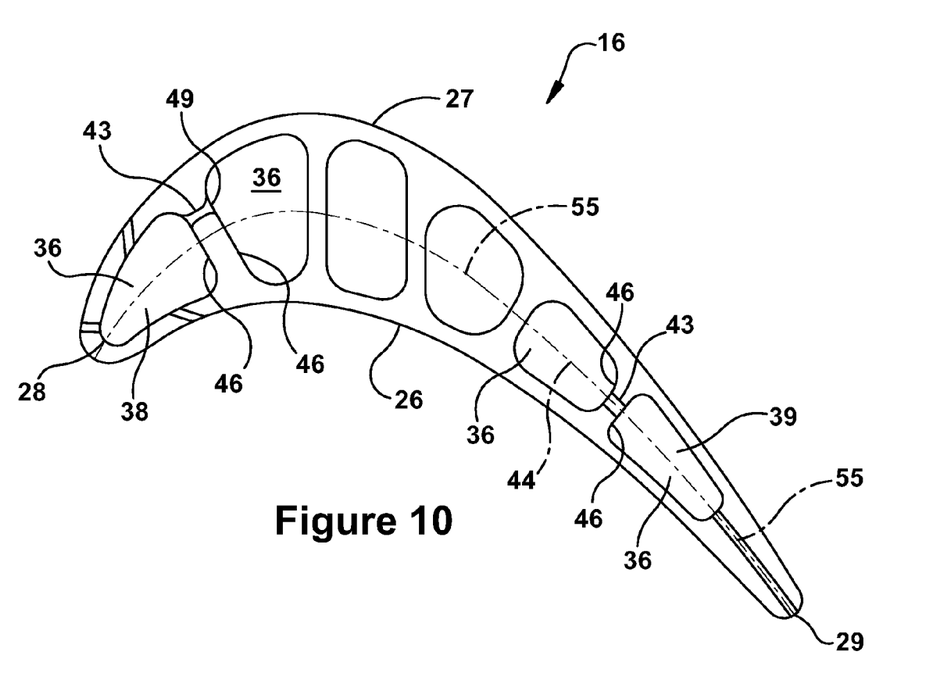
FIG. 10 is a sectional top view of a turbine rotor blade showing a staggered alignment of cross-over holes in accordance with an alternative embodiment of the present invention.

FIG. 10 is a sectional top view of an airfoil 25 of turbine rotor blade showing a staggered alignment of crossover passages 43 in accordance with an alternative embodiment of the present invention. In this case, the airfoil 25 also includes flow passages 36 that extend side-by-side along a segment of their length and are connected by multiple crossover passages 43 which are staggered about a reference plane 44. The crossover passages 43 connect to the flow passages 36 at ports 49 formed in the inner walls. It will be appreciated that the staggered configuration of the present invention may include one in which the crossover passages 43 or the ports 49 they formed align linearly. It will be appreciated that this type of configuration disperses operational stresses over a greater region than the linear alignment of conventional design, which will result in a more durable rotor blade 16.

Looking more closely at FIG. 10, the airfoil 25 includes two exemplary pairs of flow passages 36 that extend side-by-side over a segment of their length and which may be connected by staggered crossover passages 43. In each case, the flow passages 36 may extend side-by-side from a position near the junction of the airfoil 25 and the root 21 to a position near the outboard tip 31 of the airfoil 25, and include many radially stacked, but staggered crossover passages 43 therebetween. It will be appreciated that one of the flow passages 36 may be connected to a supply passage 52 which is configured to receive a flow of coolant through a root 21 of the rotor blade 16 during operation. In certain embodiments, the other flow passage 36 may be a leading edge flow passage 38, which is one that parallels in proximity to the leading edge 28 of the airfoil 25. In another embodiment, the other flow passage 36 may be a trailing edge flow passage 39, which is one that parallels in proximity to the trailing edge 29 of the airfoil 25.

The sectional view of FIG. 10 shows only one of the many crossover passages 43 that connect each side-by-side pair of flow passages 36. According to the present invention, the crossover passages 43 may be narrow so that a desired coolant impingement characteristic is achieved during operation. The crossover passages 43 also may be linear in configuration, and aligned so that each is substantially perpendicular to the flow passages 36 it connects. The crossover passages 43 may be staggered about a reference plane 44 so that they do not align pursuant to a common plane as the crossover passages 43 of FIGS. 5 and 6 are shown to do. In one preferred embodiment, the reference plane 44 may be a plane that extends in parallel to the flow passages 36 and bisects each such that within the segment the radially stacked crossover passages 43 may be alternatively positioned in at least two of the three positions: (1) to one side of the reference plane 44, as shown between the flow passages 36 positioned toward the leading edge 28 of the airfoil 25; (2) to the other side of the reference plane 44 (not shown in the example of FIG. 10); or (3) on the reference plane 44, as shown between the flow passages 36 positioned toward the trailing edge 29 of the airfoil 25. As shown in FIG. 10, in one preferred embodiment, the reference plane 44 may be formed relative to a camber line 55 of the airfoil 25. It will be appreciated that the camber line 55 is a line formed via the midpoints between the pressure sidewall 26 and the suction sidewall 27 of the airfoil 25. It will be appreciated that the reference plane 44 may be formed to include a plurality of camber lines 55 within the segment or a desired offset from a plurality of camber lines 55 within the segment.

FIG. 10 illustrates only a single crossover passage 43 connecting the pair of flow passages 36 positioned toward the leading edge 28 of the airfoil 25, as well as a single crossover passage 43 connecting the pair of flow passages 36 positioned toward the trailing edge 29 of the airfoil 25. It will be appreciated that, pursuant to embodiments of the present invention, each of the pairs of flow passages 36 will include crossover passages 43 having a different position relative to the reference plane 44. For example, the pair of flow passages 36 toward the leading edge 28 of the airfoil 25 may have crossover passages 43 positioned on the other side of the reference plane 44. In addition, for example, the pair of flow passages 36 positioned toward the trailing edge 29 of the airfoil 25 may have crossover passages 43 positioned to one or both side of the reference plane 44.

As stated, the crossover passages 43 connect to the flow passages 36 at port 49. One manner in which the staggered configuration of the crossover passages 43 may be achieved is to configure the crossover passage 43 such that the ports 49 on at least one of the flow passages 36 are staggered about a reference axis defined thereon. In certain embodiments, this reference axis may be linear in configuration and may be on defined on the facing inner wall 46 of one or both of the flow passages 36. The reference axis may extend longitudinally on the facing inner wall 46 of the flow passage. In certain embodiments, the reference axis, for example, may be defined relative to the airfoil 25 or the flow passages 36, which may include defining it via the location at which one of the above described references planes 44 intersects the flow passage 36. In addition, the reference axis may be defined arbitrarily as long as staggering the ports 49 about it results in a non-linear alignment. The configuration of the stagger of the ports 39 about the reference axis may be similar to that described in relation to the crossover passages 43 and the reference plane 44, further examples of which are discussed below in relation to FIGS. 11 through 13.

Figure 11:
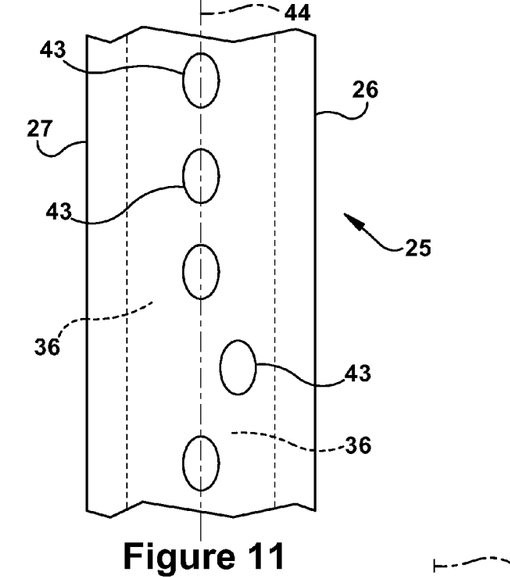
FIG. 11 is a sectional view oriented as that of FIG. 6 showing a staggered alignment of cross-over holes in accordance with an embodiment of the present invention.
Figure 12:
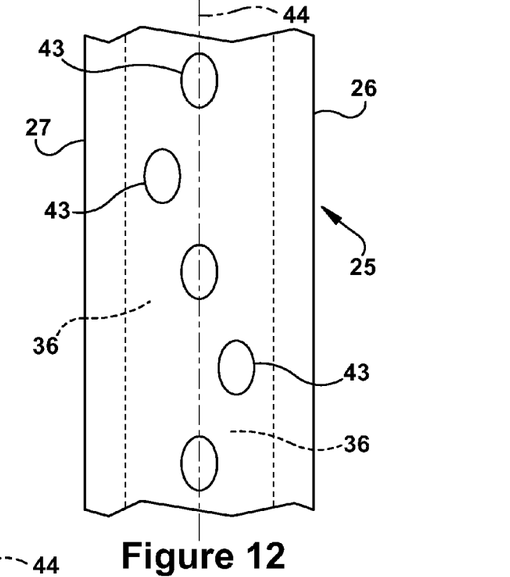
FIG. 12 is a sectional view oriented as that of FIG. 6 showing a staggered alignment of cross-over holes in accordance with an alternative embodiment of the present invention.
Figure 13:
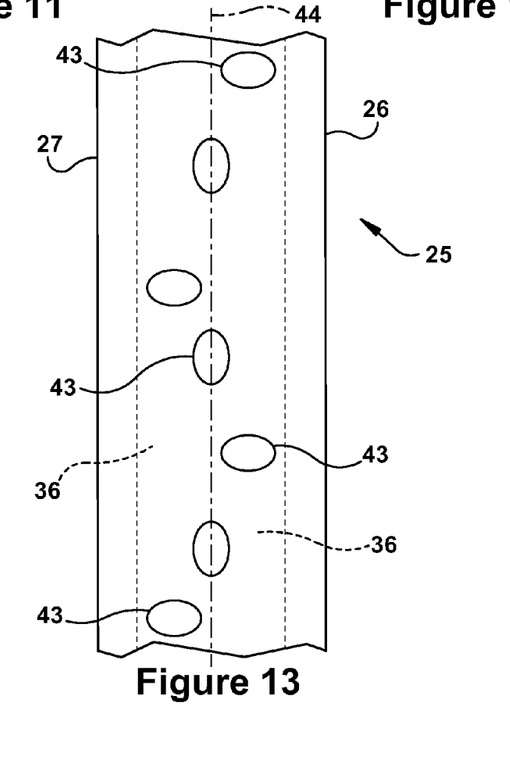
FIG. 13 is a sectional view oriented as that of FIG. 6 showing a staggered alignment of cross-over holes in accordance with an alternative embodiment of the present invention.

Turning now to FIGS. 11 through 13, in accordance with the present invention, several exemplary configurations of crossover passages 43 which are staggered relative to a reference plane 44 are provided. As stated directly above, these staggered configurations may also be applied to ports 49 staggered about a linear reference axis. According to certain embodiments, a staggered configuration may be one in which the crossover passages 43 do not align linearly. According to other embodiments, as shown in FIG. 11, a staggered configuration may be defined as one that includes at least one crossover passage 43 positioned to one side of the reference plane 44 while the other crossover passages 43 remain on the reference plane 44. According to other embodiments, as shown in FIG. 12, a staggered configuration may be defined as one that includes in every grouping of five consecutive crossover passages, at least one crossover passage 43 positioned to each side of the reference plane 44. As also shown in FIG. 12, a staggered configuration also may be defined as one that includes in every grouping of five consecutive crossover passages, at least one crossover passage 43 positioned to each side of the reference plane 44 and at least one crossover passage positioned on the reference plane 44.

In certain embodiments, as shown in FIG. 13, the crossover passages 43 may have a non-symmetrical cross-sectional shape. In such cases, a staggered configuration according to the present invention may include varying the angular orientation of the non-symmetrically shaped crossover passages 43 relative to the reference plane 44. In a preferred embodiment, the non-symmetrically shaped crossover passages 43 may have an oval shape. As illustrated, the angular orientation of the major axis of the oval shape may be alternatively made to be parallel or perpendicular to the reference plane 44. It will be appreciated the FIGS. 11 through 13 represent certain preferred or exemplary arrangements and that other staggered arrangements are possible.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:
1. An interior cooling configuration formed within an airfoil of a blade of a combustion turbine engine, the interior cooling configuration comprising:
 a first flow passage and a second flow passage that comprise a side-by-side configuration for a segment; and multiple lateral crossover passages extending between and fluidly connecting the first flow passage to the second flow passage, wherein the crossover passages are staggered;

wherein the crossover passages are spaced at longitudinal increments within the segment of the side-by-side configuration;

wherein each of the crossover passages connect to the first flow passage at a port;

wherein the crossover passages are staggered such that the ports of the first flow passage are staggered about a linear reference axis that extends longitudinally on an inner wall of the first flow passage.

2. The interior cooling configuration according to claim 1, wherein the blade comprises a turbine rotor blade.

3. The interior cooling configuration according to claim 2, wherein a reference plane bisects the first flow passage and the second flow passage;

wherein the reference plane is a straight plane; and wherein the crossover passages are staggered relative to the reference plane.

4. The interior cooling configuration according to claim 3, wherein the first flow passage includes a facing inner wall that faces the second flow passage, and the second flow passage includes a facing inner wall that faces the first flow passage;

wherein each of the crossover passages comprise a linear configuration; and wherein the reference plane bisects the facing inner wall of each of the first flow passage and the second flow passage.

5. The interior cooling configuration according to claim 4, wherein the reference plane is a curved plane that is defined relative to a dimension of the airfoil that varies within the segment.

6. The interior cooling configuration according to claim 5, wherein the reference plane is defined relative to a position of at least one of a pressure sidewall and a suction sidewall of the airfoil.

7. The interior cooling configuration according to claim 4, wherein the reference plane is a curved plane that is defined relative to a dimension of the first flow passage and the second flow passage that varies within the segment.

8. The interior cooling configuration according to claim 7, wherein the reference plane is defined relative to a width of the facing inner wall of each of the first flow passage and the second flow passage.

9. The interior cooling configuration according to claim 7, wherein the reference plane is defined relative to a centerline of the facing inner wall of each of the first flow passage and the second flow passage.

10. The interior cooling configuration according to claim 2, wherein the segment includes a multitude of crossover passages which are longitudinally spaced at regular intervals.

11. The interior cooling configuration according to claim 10, wherein the first flow passage is configured in the airfoil to extend radially between a first end positioned near an inboard boundary of the airfoil and a second end positioned near an outboard boundary of the airfoil;

wherein the second flow passage is configured within the airfoil to extend radially between a first end positioned near an inboard boundary of the airfoil and a second end positioned near an outboard boundary of the airfoil; and wherein the second flow passage connects to a supply passage which is configured to receive a flow of coolant through a root of the rotor blade during operation.

12. The interior cooling configuration according to claim 11, wherein the first flow passage is approximately parallel to the second flow passage, both of which extend in a general radial direction;

wherein each of the crossover passages is approximately perpendicular to both the first flow passage and the second flow passage; and wherein each of the crossover passages is configured to impinge a coolant flow during operation.

13. The interior cooling configuration according to claim 3, further comprising at least two groupings of five consecutive crossover passages;

wherein staggered relative to the reference plane comprises at least one crossover passage in each of the two groupings having a position removed to a first side of the reference plane.

14. The interior cooling configuration according to claim 13, wherein staggered relative to the reference plane comprises at least one crossover passage in each of the two groupings having a position removed to a second side of the reference plane.

15. The interior cooling configuration according to claim 14, wherein staggered relative to the reference plane comprises at least one crossover passage in each of the two groupings having a position that intersects the reference plane.

16. The interior cooling configuration according to claim 13, wherein the crossover passages comprise a non-symmetrical cross-sectional shape; and wherein the staggered relative to the reference plane comprises at least two crossover passages in the each of the two groupings having a differing angular orientation relative to the reference plane.

17. An interior cooling configuration formed within an airfoil of a rotor blade of a combustion turbine engine, the interior cooling configuration comprising:

a first flow passage and a second flow passage extending radially and in parallel within a segment between an inboard position and an outboard position; and multiple lateral crossover passages extending linearly between and fluidly connecting the first flow passage to the second flow passage, the crossover passages being spaced at regular radial intervals within the segment;

wherein a reference plane bisects the first flow passage and the second flow passage;

wherein the crossover passages are staggered relative to the reference plane.

18. The interior cooling configuration according to claim 17, wherein the reference plane is a curved plane that is defined relative to a dimension of the airfoil that varies within the segment;

wherein the inboard position is near a platform and the outboard position is near an outboard tip of the airfoil;

wherein the second flow passage connects to a supply passage which is configured to receive a flow of coolant through a root of the rotor blade during operation.

19. The interior cooling configuration according to claim 17, wherein the first flow passage comprises a leading edge flow passage that parallels in proximity a leading edge of the airfoil;

wherein the inboard position is near a platform and the outboard position is near an outboard tip of the airfoil;

further comprising at least two groupings of five consecutive crossover passages;

wherein staggered relative to the reference plane comprises at least one crossover passage in each of the two groupings having a position removed to a first side of the reference plane and at least one crossover passage in each of the two groupings having a position removed to a second side of the reference plane.

20. The interior cooling configuration according to claim 18, wherein the first flow passage comprises a trailing edge flow passage that parallels in proximity a trailing edge of the airfoil;
wherein the inboard position is near a platform and the outboard position is near an outboard tip of the airfoil;
further comprising at least two groupings of five consecutive crossover passages;
wherein staggered relative to the reference plane comprises at least one crossover passage in each of the two groupings having a position removed to a first side of the reference plane and at least one crossover passage in each of the two groupings having a position removed to a second side of the reference plane.

21. The interior cooling configuration according to claim 18, wherein the reference plane is defined via a plurality of airfoil camber lines within the segment.

* * * * *